United States Patent
Edvardsson et al.

(10) Patent No.: US 11,559,011 B2
(45) Date of Patent: Jan. 24, 2023

(54) SYSTEM AND METHOD FOR DETERMINING AND MANAGING ORIGIN IDENTIFICATION OF LOGS

(71) Applicant: TRACY OF SWEDEN AB, Virserum (SE)

(72) Inventors: Jonny Edvardsson, Virserum (SE); Jan-Erik Rendahl, Stockholm (SE)

(73) Assignee: TRACY OF SWEDEN AB, Virserum (SE)

( * ) Notice: Subject to any disclaimer, the term of this patent is extended or adjusted under 35 U.S.C. 154(b) by 668 days.

(21) Appl. No.: 16/477,808

(22) PCT Filed: Jan. 13, 2018

(86) PCT No.: PCT/SE2018/050030
§ 371 (c)(1),
(2) Date: Jul. 12, 2019

(87) PCT Pub. No.: WO2018/132058
PCT Pub. Date: Jul. 19, 2018

(65) Prior Publication Data
US 2020/0120882 A1    Apr. 23, 2020

(30) Foreign Application Priority Data
Jan. 16, 2017    (SE) .................................. 1730010-4

(51) Int. Cl.
*A01G 23/00*    (2006.01)
*A01G 23/08*    (2006.01)
(52) U.S. Cl.
CPC ........... *A01G 23/003* (2013.01); *A01G 23/00* (2013.01); *A01G 23/08* (2013.01)

(58) Field of Classification Search
CPC ...... A01G 23/00; A01G 23/003; A01G 23/08; A01G 23/081; A01G 23/091; G06F 16/29; G06V 20/56; G06V 20/64
(Continued)

(56) References Cited

U.S. PATENT DOCUMENTS

| 2002/0170213 A1 | 11/2002 | Latschbacher et al. |
| 2006/0096667 A1 | 5/2006 | Stevens et al. |

(Continued)

FOREIGN PATENT DOCUMENTS

| CA | 2309048 C | 7/2007 |
| WO | 9817099 A1 | 4/1998 |

(Continued)

OTHER PUBLICATIONS

Swedish search report mailed in SE Application No. SE1730010-4 dated Jun. 29, 2017, 2 pages.
(Continued)

*Primary Examiner* — Jessica Cahill
*Assistant Examiner* — Smith Oberto Bapthelus

(57) ABSTRACT

Disclosed is a system for managing identification information for a log. The system comprises an arrangement for determining an origin of the log, a computing device communicably coupled to the remote server arrangement and a communication interface that is operable to transmit the captured at least one subsequent image to the remote server arrangement. The arrangement for determining an origin of the log further comprises at least one imaging device coupled to a forest harvester, a Global Positioning System (GPS) receiver that is operatively coupled to the forest harvester and a data processor that is communicably coupled to a remote server arrangement and operable to process the
(Continued)

captured at least one image and the determined felling location of the log to create the identification information for the log.

16 Claims, 4 Drawing Sheets

(58) Field of Classification Search
USPC .......................................................... 144/335
See application file for complete search history.

(56) References Cited

U.S. PATENT DOCUMENTS

| | | |
|---|---|---|
| 2011/0298889 A1 | 12/2011 | Seto |
| 2015/0124054 A1 | 5/2015 | Darr et al. |
| 2015/0256742 A1 | 9/2015 | Wexler et al. |
| 2017/0249512 A1* | 8/2017 | McClatchie .......... A01M 1/026 |

FOREIGN PATENT DOCUMENTS

| | | | |
|---|---|---|---|
| WO | WO-9923873 A1 * | 5/1999 | ............. A01G 23/00 |
| WO | 0213597 A1 | 2/2002 | |
| WO | 2006126952 A1 | 11/2006 | |
| WO | 2012069698 A1 | 5/2012 | |
| WO | 2014195585 A1 | 12/2014 | |

OTHER PUBLICATIONS

Multhaler, Evelyn; International Search Report for International Patent Application No. PCT/SE2018/050030, dated Dec. 4, 2018, 4 pages.

Multhaler, Evelyn; Written Opinion for International Patent Application No. PCT/SE2018/050030, dated Dec. 4, 2018, 9 pages.

* cited by examiner

SYSTEM AND METHOD FOR DETERMINING AND MANAGING ORIGIN IDENTIFICATION OF LOGS

TECHNICAL FIELD

The present disclosure relates to systems for use in timber industries, for example to a system for managing identification information for a given log. Moreover, the present disclosure also concerns methods of using aforementioned systems in timber industries, for example to a method for managing identification information for a given log.

BACKGROUND

In timber industries, appropriate origin identification of a given log (or a given lumber) is a critical stage in an entire supply chain for providing timber-derived products, for example for quality assurance purposes. Conventionally, a given log is sprayed or imprinted with an identification code or symbol for tracking an origin of the given log, for example for defining a particular geographical region from which the given log originated and its date of harvesting. Generally, such identification techniques are performed at high speed and poor quality, which makes them unreliable. Furthermore, such identification may change during the supply chain due to various conditions such as climate, humidity, improper processing of the given log, substandard handling of the given log during transit, and so forth. For example, an identification code may fade away when subjected to rain or moist air. In such situations, to keep the identification codes legible, the identification code requires constant maintenance (such as reapplication during the supply chain).

Typically, there are a limited number of methods of identifying an origin of a log. One commonly known method for identifying a log includes using electronic databases for identifying an origin of the log. However, such databases generally provide information about logs from a region having known species of trees that are processed to produce logs. In such a situation, the information may not enable identification of the origin of the log. Another method of identifying an origin of a log includes capturing images of a region from where the log is harvested (such as a fall site), and images of a portion of the harvested log. Subsequently, such images are processed to identify the origin of the log. In such a situation, the images of the log are saved into a database, and the images are retrieved at a later stage to identify the log. However, such a method fails to link (or identify) a log to a specific tree or a specific fall site.

Therefore, in light of the foregoing discussion, there exists a need to address, for example to overcome, the aforementioned drawbacks associated with identifying an origin of a log.

SUMMARY

The present disclosure also seeks to provide a system for managing identification information for a log.

The present disclosure also seeks to provide a method of managing identification information for a log.

In a first aspect, an embodiment of the present disclosure provides a system for managing identification information for a log, wherein the system comprises:

an arrangement for determining an origin of the log, wherein the arrangement comprises:

at least one imaging device coupled to a forest harvester, the at least one imaging device being operable to capture at least one image of a side of the log;

a Global Positioning System (GPS) receiver that is operatively coupled to the forest harvester, wherein the GPS receiver is operable to determine a felling location of the log; and a data processor that is communicably coupled to a remote server arrangement and operable to process the captured at least one image and the determined felling location of the log to create the identification information for the log;

a computing device communicably coupled to the remote server arrangement, the computing device comprises:

at least one imaging device that is operable to capture at least one subsequent image of the side of the log; and a communication interface that is operable to transmit the captured at least one subsequent image to the remote server arrangement;

wherein the remote server arrangement is operable to authenticate the identification information for the log by comparing features of the captured at least one subsequent image captured by the at least one imaging device of the computing device to features of the at least one image captured by the at least one imaging device of the arrangement to recognize common features therebetween, wherein the authentication is successful when a number of common features therebetween is higher than a predetermined minimum value, and wherein, the computing device is operable to be installed at a feed unit of a saw mill, and wherein the saw mill is operable to process the log upon authentication of the identification information for the log.

The present disclosure is of advantage is that it provides an at least partial solution to a problem of identifying an origin of a log by creating identification information for the log, wherein the identification information primarily includes an image of a side of the log and includes determining a felling location of the log; the identification information is made more accurate or efficient by associating the identification information with other identifying parameters, described herein later.

Optionally, the at least one imaging device of the arrangement is operable to capture the at least one image at an oblique angle.

Optionally, wherein the least one imaging device of the arrangement is mounted on a harvester head of the forest harvester and positioned proximate to a chainsaw of the harvester head, to capture the at least one image of the side of the log.

Optionally, the at least one imaging device of the arrangement is mounted fixedly or retractably on the harvester head.

Optionally, the system further comprises a fibre optic assembly operatively coupled to the at least one imaging device of the arrangement for capturing the at least one image.

Optionally, the system further comprises a marking device operable to mark the log, wherein the processor is operable to associate the mark with the identification information for the log. More optionally, the marking device comprises a laser and an inkjet marker.

Optionally, the at least one imaging device of the arrangement comprises a high resolution digital camera.

Optionally, the at least one imaging device of the arrangement further comprises a microwave imaging device.

Optionally, the system further comprises at least one sensor operable to measure at least a weight, a length, a diameter and a quality of the log, wherein the processor is operable to associate the measured at least weight, the length, the diameter and the quality with the identification information for the log. More optionally, the identification information for the log further comprises type of tree.

Optionally, the processor comprises a controller of the forest harvester, wherein the controller is operable to acquire, store and process data associated with the at least one image, the felling location of the log, the mark on the log, the weight of the log, the length of the log, the diameter of the log, the quality of the log, and the type of tree for creating the identification information for the log.

Optionally, the processor is communicably coupled to a remote server arrangement and the processor is operable to transmit to the remote server arrangement, the data associated with the at least one image captured by the at least one imaging device of the arrangement, the felling location of the log, the mark on the log, the weight of the log, the length of the log, the diameter of the log, the quality of the log, and the type of tree, to the remote server arrangement for creating the identification information for the log.

Optionally, the system further comprises a handheld camera operable to capture an image of the side of the log, wherein the captured image by the handheld camera is associated with the identification information for the log.

Optionally, the log is one of a batch of logs, and wherein the batch of logs comprises at least two logs.

Optionally, the computing device is a portable computing device.

In a second aspect, an embodiment of the present disclosure provides a method of managing identification information for a log, the method comprising:
  determining an origin of the log by an arrangement, wherein the method of determining the origin of the log comprises:
    capturing at least one image of a side of the log using at least one imaging device coupled to a forest harvester;
    determining a felling location of the log, using a Global Positioning System (GPS) receiver operatively coupled to the forest harvester; and
    processing the captured at least one image and the determined felling location of the log using a data processor, to create an identification information for the log, wherein the data processor is communicably coupled to a remote server arrangement;
  capturing at least one subsequent image of the side of the log using a computing device, wherein the computing device is communicably coupled to the remote server arrangement;
  transmitting the captured at least one subsequent image to the remote server arrangement; and
  comparing features of the captured at least one subsequent image to features of the at least one image captured by the at least one imaging device of the computing device to the at least one image captured by the at least one imaging device of the arrangement, at the remote server arrangement, for authenticating the identification information for the log to recognize common features therebetween, wherein the authentication is successful when a number of common features therebetween is higher than a predetermined minimum value, and wherein, the computing device is operable to be installed at a feed unit of a saw mill, and wherein the saw mill is operable to process the log upon authentication of the identification information for the log.

Optionally, the method further comprises marking the log using a marking device to provide a mark on the log, wherein the mark on the log is associated with the identification information for the log. More optionally, the method further comprises measuring at least a weight, a length, a diameter and a quality of the log using at least one sensor, wherein the measured at least weight, the length, the diameter and the quality is associated with the identification information for the log. Moreover optionally, the method further comprises identifying a type of tree, to be associated with the with the identification information for the log.

Optionally, in the method, a controller of the processor is operable to acquire, store and process data associated with the at least one image captured by the at least one imaging device of the arrangement, the felling location of the log, the mark on the log, the weight of the log, the length of the log, the diameter of the log, the quality of the log, and the type of tree, for creating the identification information for the log.

Optionally, in the method, a remote server arrangement is operable to acquire, store and process data associated with the at least one image captured by the at least one imaging device of the arrangement, the felling location of the log, the mark on the log, the weight of the log, the length of the log, the diameter of the log, the quality of the log, and the type of tree, for creating the identification information for the log.

Optionally, the method further comprises capturing an image of the side of the log using a handheld camera, wherein the captured image by the handheld camera is associated with the identification information for the log.

Optionally, in the method, the log is one of a batch of logs, and wherein the batch of logs comprises at least two logs.

Optionally, the method further comprises:
  acquiring a first number of logs, wherein the first number is a count of logs at the felling location of the batch, and
  determining a second number of logs, wherein the second number is a count of logs within the batch at a saw mill.

Optionally, the method further comprises comparing the determined second number of logs with the acquired first number of logs and
  authenticating identification information for the log if the second number is less than the first number; and
  recording authentication failure of the identification information for the log, if the second number is equal to or more than the first number.

The present disclosure provides a system and a method for managing identification information for the log. The described system and method create and store accurate identification information for logs and also include provisions for authentication thereof. Therefore, authentication of logs is thereby highly accurate and key players within the timber industry value chain can efficiently trace origin of logs to felling locations thereof. Furthermore, the disclosed methods and system describe provisions for sharing the created identification information with such key players and allow means for authentication of the created identification information any processing step. Therefore, the created identification information may be constantly updated and the key players in the value chain are able to verify genuineness of both processed and unprocessed logs at any step of the value chain. Furthermore, the identification information is associated with a log right from an instant the log is felled until completion of lifecycle of the log, thereby, for example, minimizing a number of unaccounted (or unidentified and off-the-record) logs in the value chain and thereby streamlining the timber industry value chain.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
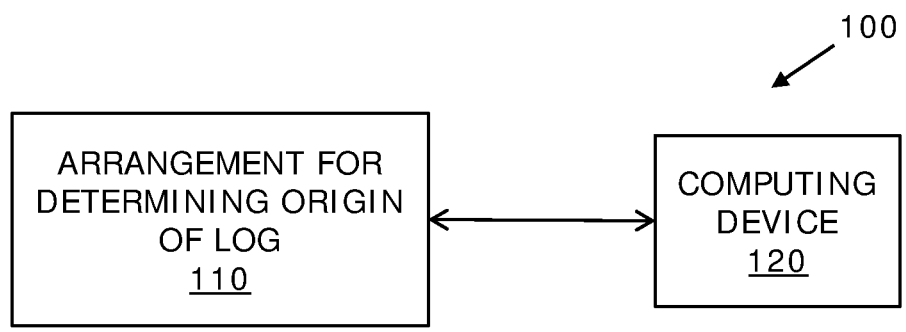
FIG. 1 is a block diagram of system for managing identification information for a log, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In first aspect, an embodiment of the present disclosure provides a system for managing identification information for a log, wherein the system comprises:

an arrangement for determining an origin of the log, wherein the arrangement comprises:
- at least one imaging device coupled to a forest harvester, the at least one imaging device being operable to capture at least one image of a side of the log;
- a Global Positioning System (GPS) receiver that is operatively coupled to the forest harvester, wherein the GPS receiver is operable to determine a felling location of the log; and
- a data processor that is communicably coupled to a remote server arrangement and operable to process the captured at least one image and the determined felling location of the log to create the identification information for the log;

a computing device communicably coupled to the remote server arrangement, the computing device comprises:
- at least one imaging device that is operable to capture at least one subsequent image of the side of the log; and
- a communication interface that is operable to transmit the captured at least one subsequent image to the remote server arrangement;

wherein the remote server arrangement is operable to authenticate the identification information for the log by comparing features of the captured at least one subsequent image captured by the at least one imaging device of the computing device to features of the at least one image captured by the at least one imaging device of the arrangement to recognize common features therebetween, wherein the authentication is successful when a number of common features therebetween is higher than a predetermined minimum value, and wherein, the computing device is operable to be installed at a feed unit of a saw mill, and wherein the saw mill is operable to process the log upon authentication of the identification information for the log.

In a second aspect, an embodiment of the present disclosure provides a method of managing identification information for a log, the method comprising:

determining an origin of the log by an arrangement, wherein the method of determining the origin of the log comprises:
- capturing at least one image of a side of the log using at least one imaging device coupled to a forest harvester;
- determining a felling location of the log, using a Global Positioning System (GPS) receiver operatively coupled to the forest harvester; and
- processing the captured at least one image and the determined felling location of the log using a data processor, to create an identification information for the log, wherein the data processor is communicably coupled to a remote server arrangement;

capturing at least one subsequent image of the side of the log using a computing device, wherein the computing device is communicably coupled to the remote server arrangement;

transmitting the captured at least one subsequent image to the remote server arrangement; and comparing features of the captured at least one subsequent image to features of the at least one image captured by the at least one imaging device of the computing device to the at least one image captured by the at least one imaging device of the arrangement, at the remote server arrangement, for authenticating the identification information for the log to recognize common features therebetween, wherein the authentication is successful when a number of common features therebetween is higher than a predetermined minimum value, and wherein, the computing device is operable to be installed at a feed unit of a saw mill, and wherein the saw mill is operable to process the log upon authentication of the identification information for the log.

The system for managing identification information for a log includes an arrangement for determining an origin of the log and a computing device. The arrangement for determining the origin of the log includes at least one imaging device coupled to a forest harvester and operable to capture at least one image of a side of the log, a Global Positioning System (GPS) receiver that is operatively coupled to the forest harvester and operable to determine a felling location of the log and a data processor that is communicably coupled to a remote server arrangement and operable to process the captured at least one image and the determined felling location of the log to create the identification information for the log. The computing device of the system is communicably coupled to the remote server arrangement and includes at least one imaging device operable to capture at least one subsequent image of the side of the log and a communication interface operable to transmit the captured at least one subsequent image to the remote server arrangement. The remote server arrangement is operable to authenticate the identification information for the log by comparing features of the captured at least one subsequent image captured by the at least one imaging device of the computing device to features of the at least one image captured by the at least one imaging device of the arrangement to recognize common features therebetween, wherein the authentication is successful when a number of common features therebetween is higher than a predetermined minimum value and the computing device is operable to be installed at a feed unit of a saw mill, and wherein the saw mill is operable to process the log upon authentication of the identification information for the log.

In one embodiment, the imaging device is operable to capture at least one image of the side of the log, particularly, the side includes a portion of the log which includes annual (or growth or aging) rings. In other words, the side of the log may be a lateral side of the log. Alternatively, the side may include a portion of the log that may include other biomarkers that may be accounted for providing a distinct identity to the log.

The arrangement also includes a Global Positioning System (GPS) receiver operatively coupled to the forest harvester, the GPS receiver operable to determine a felling location of the log; GPS is based upon using signals emitted from a plurality of orbiting satellites.

In one embodiment, the GPS receiver includes a GPRS receiver that is operable to determine position based upon wireless emissions of a cellular mobile telephone infrastructure. In one embodiment, the GPS receiver may be a separate GPS receiver coupled to the forest harvester. Alternatively, the GPS receiver may be a GPS receiver of the forest harvester.

In one embodiment, the felling location of the log may include a geographical location, such as geographical coordinates of the felling location (or site). For example, the felling location of a log may be associated with a geographical location (or geographical coordinates) of the forest harvester, while harvesting or cutting the log occurs in operation. Therefore, the felling location for different logs changes with geographical locations of the forest harvester, while harvesting or cutting such logs.

The data processor of the arrangement is operable to process the captured at least one image and the determined felling location of the log to create an identification information for the log. Specifically, for each harvested log, the image of the side of the harvested log and its felling location are combined to form (or create) a distinct origin identification information for that harvested log, which is further explained in greater detail herein later. It will be appreciated that the image of the side of the harvested log is supplemented with one or more cross-sectional images of an exposed surface whereat the harvested log has been cut (namely, sawn).

In one embodiment, the at least one imaging device is operable to capture the at least one image at an oblique angle, namely not at an orthogonal angle to an elongate axis of the log or a surface of the log that is being imaged. Specifically, the at least one imaging device may be held or arranged obliquely for taking oblique images of the side of the log. Furthermore, the imaging device is operable to capture image of the side of the log, when held obliquely by delimbing arms of the harvester head. Subsequent to cutting the log, the forest harvester may be operable to tilt the log from the vertical position (of the tree). In such instance, it will be appreciated that the log may be pivoted at the delimbing arms of the harvester head (or the point where the forest harvester holds the log) such that the log rests in an inclined position on the delimbing arm. Therefore, the image captured in such instance may be an oblique image of the side of the log.

In an embodiment, the at least one imaging device is mounted on a harvester head of the forest harvester and positioned proximate to a chainsaw of the harvester head, to capture the at least one image of the side of the log. Specifically, the imaging device is mounted in the harvester head in a manner such that the imaging device is capable of capturing image of the side of the log. In one embodiment, the imaging device may be mounted inside of a protective housing near the chain saw to prevent contact of the chain saw with the imaging device that may result in damage thereof.

According to an embodiment, the at least one imaging device is mounted fixedly or retractably onto the harvester head. The imaging device may be mounted fixedly using a suitable mechanical coupling arrangement, such as brackets, screws and the like. The imaging device may be mounted retractably using a retractable mechanism, such as a retractable rod (for example, a telescopic rod), that allows the imaging device to protrude from a rest position inside the protective housing of the chain saw to a work position in front of the side of the log. The imaging device accordingly takes (namely, captures) an image of the side of the log and is moved back to its rest position before the tree is protruded from the harvester head to start the next cutting step for a next log.

In one embodiment, a single image of a side of log is processed to form identification information corresponding to the log. In another embodiment, multiple images of a side of a same log may be processed to form identification information corresponding to the log. The multiple images may be captured using multiple imaging devices mounted at different positions in the harvester head. Otherwise, a single imaging device may be operable to capture multiple images, which may be processed to form the identification information corresponding to a log.

In one embodiment, the system further includes a fibre optic assembly that is operatively coupled to the at least one imaging device for capturing the at least one image. The fibre optic assembly may enable an imaging device, positioned away from the chainsaw housing or positioned in a manner that hinders visibility of the imaging device, to capture the image of the side of the log. In one embodiment, the fibre optic assembly may include a fibre (US English: fiber) optic camera. For example, the fibre optic assembly may comprise a camera connected to a fiberscope. In an example, the lens of the fiberscope extends above the saw of the harvester head to enable capturing of an image of a side of a log from an oblique angle. Furthermore, the fibre optic assembly (such as the fiberscope) may extend in a protective tube to prevent damage to the fibre optic assembly or accumulation of saw dust on the lens of the fibre optic assembly.

In one embodiment, the system further includes a marking device that is operable to mark the log. In such a situation, the data processor is operable to associate the mark with the identification information for the log. For example, the mark on the side of the log may be made prior to capturing an image of the side; this allows the mark to be included in the captured image. Accordingly, the data processor is operable to associate the mark with the identification information for the log. In one example embodiment, the mark on the log may be read physically for fetching identification information for the log.

In one embodiment, the marking device includes a laser. For example, the marking device may be a carbon dioxide laser, or any suitable laser device capable of marking log (or wood); such a laser device is operable to heat wood to cause surface charring of the wood. In another embodiment, the marking device may include an inkjet marker. In one embodiment, the marking device may be mounted on the harvester head, such that a side of a log may be exposed to form a mark thereon. For example, the marking device may be mounted within the harvester head.

In one embodiment, the at least one imaging device comprises a high resolution digital camera. By "high resolution" is meant more than 1000 pixels in X- and Y-Cartesian axes of a given captured digital image, more optionally more than 2000 pixels in X- and Y-Cartesian axes of a given captured digital image.

In an embodiment, the at least one imaging device further includes a microwave imaging device. The use of microwave imaging device may enable in determining interior (inside) properties of the log, such as a grain texture of wood of the log, the density of the log, the moisture content of the log and so forth. According to an embodiment, the data processor may be operable to associate the information determined by the microwave imaging device with the identification information for the log. By "microwaves" is meant electromagnetic radiation in a frequency range of 5 GHz to 500 GHz, more optionally electromagnetic radiation in a frequency range of 10 GHz to 200 GHz.

According to an embodiment, the system further includes at least one sensor that is operable to measure at least a weight, a length, a diameter and a quality of the log. For example, the arrangement may include a load cell, which may be mounted on the harvester head and operable to measure weight (or load) of the log, when held by delimbing arms of the harvester head. In one embodiment, the length of the log may be derived using an imaging device and an image processing technique. For example, an imaging device may be operable to capture an image of the log longitudinally, and thereafter an image processing technique is used to process the image to determine the length of the log. Alternatively, the length of the log may be determined by measurement using a non-contact measurement technique, such as by using a laser distance measuring device.

In one embodiment, the diameter and the quality of the log may be derived using the imaging device and an image processing technique. For example, the imaging device may be operable to capture an image of the log laterally (or sideway), and thereafter an image processing technique is used to process the image to determine the diameter of the log. In one embodiment, the imaging device may be operable to capture images of both lateral ends (or sides) of the log, and such images may be processed to determine the diameters of the log at both ends.

In an embodiment, the quality of the log may be derived using the imaging device and an image processing technique. For example, the imaging device may be operable to capture an image of the log laterally (or sideway), and thereafter an image processing technique is used to process the image to determine the quality of the log. Specifically, such image may include annual rings, and the image processing technique used to process such image to determine a number of annual rings and spaces therebetween to determine the quality of the log. For example, uniformly and distinct annual rings may indicate a good quality of the log, whereas non-uniform and indistinct annual rings may indicate a poor quality of the log. In one embodiment, the imaging device may be operable to capture images of both lateral ends of the log, and such images may be processed to determine the quality of the log.

In one embodiment, the data processor is operable to associate the measured at least weight, the length, the diameter and the quality with the identification information for the log.

In one embodiment, the identification information for the log further comprises type of tree. The type of tree may be identified by a person operating the forest harvester. It is to be understood that, the person operating the forest harvester may include sufficient knowledge for the type of trees to be harvested using the forest harvester operated by himself. For example, the type of trees may include oak tree, larch tree, spruce tree and so forth.

In one embodiment, the data processor of the arrangement includes a controller of the forest harvester. The controller is operable to acquire, store and process data associated with the at least one image, the felling location of the log, the mark on the log, the weight of the log, the length of the log, the diameter of the log, the quality of the log, and the type of tree, for creating the identification information for the log. It is to be understood that, the person (operating the forest harvester) may identify and feed the type of tree into the controller (i.e. the data processor) of the forest harvester.

In another embodiment, the data processor is communicably coupled to a remote server arrangement and the processor is operable to transmit to the remote server arrangement, the data associated with the at least one image, the felling location of the log, the mark on the log, the weight of the log, the length of the log, the diameter of the log, the quality of the log, and the type of tree, to the remote server for creating the identification information for the log. The processor is communicably coupled to the remote server using a communication network, such a wired communication network, a wireless communication network or any combination thereof. Furthermore, the remote server arrangement may include a database for storing acquired or process data.

In one embodiment, the system further includes a handheld camera that is operable to capture an image of the side of the log. The captured image by the handheld camera is associated with the identification information for the log. In an example, the handheld camera may include a mobile communication device, a laptop computer, a tablet computer and so forth. Furthermore, the handheld camera may be a GPS-enabled device that is operable to access the Internet or similar data communication network, for allowing the handheld camera to transmit captured image and felling location to the remote server arrangement.

The computing device of the system for managing identification information for a log is communicably coupled to the remote server arrangement. The computing device comprises at least one imaging device that is operable to capture at least one subsequent image of the side of the log, and a communication interface that is operable to transmit the captured at least one subsequent image to the remote server arrangement. Specifically, the at least one subsequent image of the side of the log may be captured in operation at a later time as compared to the at least one image captured by the at least one imaging device of the arrangement.

Optionally, the captured at least one subsequent image may be stored at the database of the remote server arrangement.

It will be appreciated that the communication interface of the computing device is compatible with a communication interface of the remote server arrangement. Specifically, the captured at least one subsequent image may be transmitted to the remote server arrangement via a data communication network, for example the Internet or similar.

In one embodiment, conventional pattern recognition algorithms may be employed for recognizing features within the captured at least one subsequent image and the at least one image captured by the at least one imaging device. For example, such features may also relate to the felling location of the log, the mark on the log, the weight of the log, the length of the log, the diameter of the log, the quality of the log, the type of tree and so forth.

In an embodiment, the computing device may further comprise the marking device and/or the at least one sensor that is operable to measure at least the weight, the length of the log, the diameter of the log, and the quality of the log. Optionally, the computing device may be a portable computing device. Examples of the computing device include, but are not limited to, a digital camera, a smart phone, a tablet computer, and a laptop computer. Alternatively, the computing device may be a fixed computing device (for example, a powerful proprietary computer-based industrial controller).

In an embodiment, the computing device is operable to process the log upon authentication of the identification information for the log. Specifically, upon successful authentication, the saw mill may be operable to process the log into lumber (or beams and/or planks). Furthermore, in such embodiment, the computing device may be the fixed computing device such as a wall mounted digital camera, a floor mounted monopod, and so forth. It will be appreciated that the feed unit of the saw mill is operable to receive the log prior to processing thereof, so as to authenticate the identification information for the log.

According to an embodiment, the log may be one of a batch of logs, wherein the batch of logs comprises at least two logs. In such an embodiment, the aforementioned system may manage identification information for each log of the batch of logs. In an embodiment, the term "batch of logs" used herein relates to a collection/group of logs. In an example, the batch of logs may comprise at least two logs obtained from a same felling location. In another example, the batch of logs may comprise at least two logs of a same length. In yet another example, the batch of logs may comprise at least two logs of a same diameter.

The method of managing identification information for a log comprises determining an origin of the log by an arrangement, capturing at least one subsequent image of the side of the log using a computing device communicably coupled to a remote server, transmitting the captured at least one subsequent image to the remote server arrangement and comparing features of the captured at least one subsequent image to features of the at least one image captured by the at least one imaging device of the computing device to the at least one image captured by the at least one imaging device of the arrangement, at the remote server arrangement, for authenticating the identification information for the log to recognize common features therebetween, wherein the authentication is successful when a number of common features therebetween is higher than a predetermined minimum value, and wherein, the computing device is operable to be installed at a feed unit of a saw mill, and wherein the saw mill is operable to process the log upon authentication of the identification information for the log. The method of determining the origin of the log includes capturing at least one image of a side of the log using at least one imaging device coupled to a forest harvester, determining a felling location of the log, using a Global Positioning System (GPS) receiver operatively coupled to the forest harvester, and processing the captured at least one image and the determined felling location of the log using a data processor, to create an identification information for the log, wherein the data processor is communicably coupled to a remote server arrangement.

In one embodiment, the captured image may be an image of the side of the log, such as a crosscut plane of the log.

In an embodiment, the forest harvester may be operable to capture the image of the log at an oblique angle subsequent to cutting the log; a definition of "oblique angle" is provided in the foregoing, namely non-orthogonal. For example, the forest harvester may be operable to tilt the log to a substantially horizontal position from a vertical position thereof, subsequent to cutting the log. Furthermore, the image of the crosscut plane of the tilted log may be captured. In an embodiment, the image of the side of the log may relate to an image of the thicker end (or the end towards the root of the tree) of the log. For example, subsequent to cutting a tree adjacent to the root, the forest harvester may be operable to tilt the log by holding the thicker end thereof. Furthermore, the imaging device may be operable to capture an image of the thicker end of the tilted log. In another embodiment, the forest harvester may be operable to section the log and thereby, capture images of the thicker ends of the sections of the log.

The method further comprises determining a felling location of the log, using a Global Positioning System (GPS) receiver operatively coupled to the forest harvester. In an embodiment, the felling location of the log may relate to the location of the forest harvester. For example, the location of the forest harvester at the time of cutting the log may relate substantially to the location of the tree and thereby, the felling location of the log.

The method also comprises processing the captured at least one image and the determined felling location of the log using a data processor, to create an identification information for the log.

In an embodiment, the method further comprises marking the log using a marking device, wherein the mark on the log is associated with the identification information for the log. For example, the mark on the log may comprise laser marking made using a Carbon Dioxide ($CO_2$) laser along annual rings of the log. Alternatively, the marking device is implemented as an inkjet marking that ejects ink from an actuated nozzle or an array of nozzles for imprinting the mark on the log. In one embodiment, the marking device may comprise a laser engraving device. It may be evident that the laser engraving device may be operable to engrave the mark by removal of material on the side (such as the crosscut plane) of the log. In another example, the laser engraving on the log may replace the annual rings on the log. In yet another example, the marking on the log may comprise lines, such as a barcode, along the annual rings of the log.

According to an embodiment, the method comprises measuring at least a weight, a length, a diameter and a quality of the log using at least one sensor, wherein the measured at least weight, the length, the diameter and the quality is associated with the identification information for the log. For example, a weight of a log may be 900 kilograms and may have a length of 10 metres. Further, a diameter (based on a larger side of the log) may be 2 metres, and uniformly and distinct annual rings may indicate good quality of the log. The weight, the length, the diameter and the quality of the log may be associated to the identification information for the log, such as the captured image of the log and the felling location of the log.

In one embodiment, the method further comprises identifying a type of tree, to be associated with the with the identification information for the log. The type of tree may be identified by a person operating the forest harvester.

In one embodiment, the method comprises a controller of the data processor that is operable to acquire, store and process data associated with the at least one image, the felling location of the log, the mark on the log, the weight of the log, the length of the log, the diameter of the log, the quality of the log, and the type of tree, for creating the identification information for the log.

In another embodiment, the method comprises using a remote server arrangement that is operable to acquire, store and process data associated with the at least one image, the felling location of the log, the mark on the log, the weight of the log, the length of the log, the diameter of the log, the quality of the log, and the type of tree, for creating the identification information for the log.

In an embodiment, the method further comprises capturing an image of the side of the log using a handheld camera, wherein the captured image by the handheld camera is associated with the identification information for the log. The handheld camera may be associated with a mobile communication device, such as a mobile wireless communication device (e.g. a mobile telephone, a cell phone), a tablet computer, a laptop computer and so forth. The image of the side of the log captured using the handheld camera may be transmitted to the remote server arrangement.

In an embodiment, the method comprises creating the identification information for the log using an arrangement according to the aforementioned embodiments, capturing at least one subsequent image of the side of the log using a computing device, wherein the computing device is communicably coupled to a remote server arrangement, for transmitting the captured at least one subsequent image to the remote server arrangement, and for comparing the captured at least one subsequent image to the at least one image captured by the at least one imaging device of the arrangement, at the remote server arrangement, for authenticating the identification information for the log.

In an embodiment, the method may further comprise authenticating the identification information for a log of the batch by authenticating the identification information for another log of the batch. In such an embodiment, if both logs belong to the same batch, authenticated identification information for the another log may indicate authenticity (or correctness) of the identification information for the log. Specifically, such an authentication may be performed by the remote server arrangement. Beneficially, such an authentication may prevent authentication failure on account of insufficient number (or lower than the predetermined minimum value) of the common features between the captured at least one subsequent image of the side of the log and the at least one image captured by the at least one imaging device. More specifically, such an authentication may be utilized in a situation wherein a quality of the at least one image of the log, captured by the at least one imaging device, is low (for example, out-of-focus, occluded, too light, too dark, shadowed, smeared or similar).

According to an embodiment, the method may further comprise acquiring a first number of logs, wherein the first number is a count of logs at the felling location of the batch, and determining a second number of logs, wherein the second number is a count of logs within the batch at the saw mill. It is to be understood that in such an embodiment, all logs constituting the batch are felled at the same felling location. Specifically, the remote server arrangement may acquire the first number of logs from the processor of the arrangement and/or from a person in-charge (or a feller) at the felling location of the batch. Furthermore, a person in-charge at the saw mill may manually determine the second number of logs or the remote server may automatically acquire the second number of logs from an inventory of the saw mill.

Furthermore, in an embodiment, the method may comprise comparing the determined second number of logs with the acquired first number of logs. In such an embodiment, the method may comprise authenticating identification information for the log if the second number is less than the first number. Specifically, if the count of logs within the batch at the saw mill is less than the count of logs at the felling location, the log under consideration may be understood to belong to the batch. Furthermore, in such an embodiment, the method may comprise recording authentication failure of the identification information for the log, if the second number is equal to or more than the first number. Specifically, in a situation where the second number is equal to the first number, an authentication failure of the identification information for the log may be recorded on account of a high likelihood of the log belonging to another batch. In such a situation, the log may be categorized as being "unidentified" and may not be processed until its identification information is authorized, for example manually authorized. Specifically, in another situation where the second number is more than the first number, an authentication failure of the identification information for the log may be recorded on account of a high likelihood of the log belonging to another batch, since all the logs of the batch are understood to have reached the saw mill. More specifically, the second number being more than the first number may indicate that the first number of logs at the felling location is already a part of the second number of logs at the saw mill. In such a situation, the log may be categorized as being "unidentified" and may not be processed until its identification information is authorized.

DETAILED DESCRIPTION OF THE DRAWINGS

FIG. 1 is a block diagram of system 100 for managing identification information for a log, in accordance with an embodiment of the present disclosure. The system 100 includes an arrangement 110 for determining an origin of a log and a computing device 120 communicably coupled to a remote server arrangement.

Figure 2:
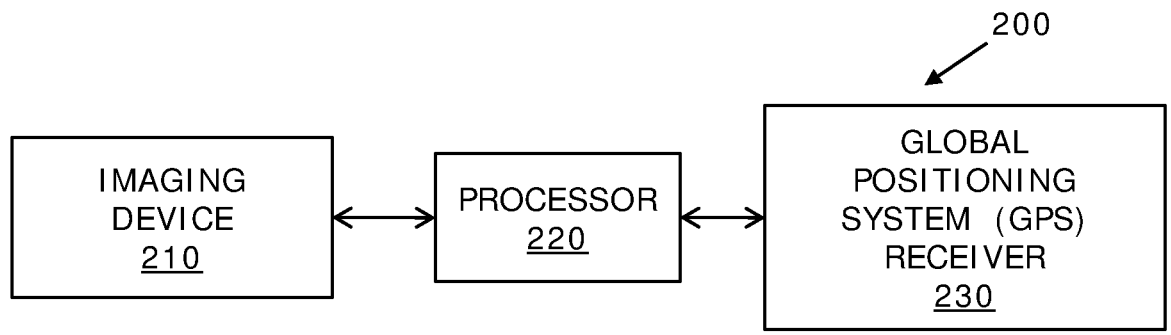
FIG. 2 is a block diagram of an arrangement for determining an origin of a log, in accordance with an embodiment of the present disclosure.

FIG. 2 is a block diagram of an arrangement 200 (such as the arrangement 110 of FIG. 1) for determining an origin of a log, in accordance with an embodiment of the present disclosure. The arrangement 200 is installed in operation on a forest harvester (not shown) and comprises an imaging device 210 that is operable to capture at least one image of a side of the log. Furthermore, the arrangement 200 comprises a Global Positioning System (GPS) receiver 230 operable to determine a felling location of the log; optionally the receiver 230 is implemented using GPRS, as aforementioned (either as an alternative to GPS or an addition to GPS). Additionally, the arrangement 200 comprises a data processor 220 that is operable to process the captured at least one image and the determined felling location of the log to create an identification information for the log.

Figure 3:
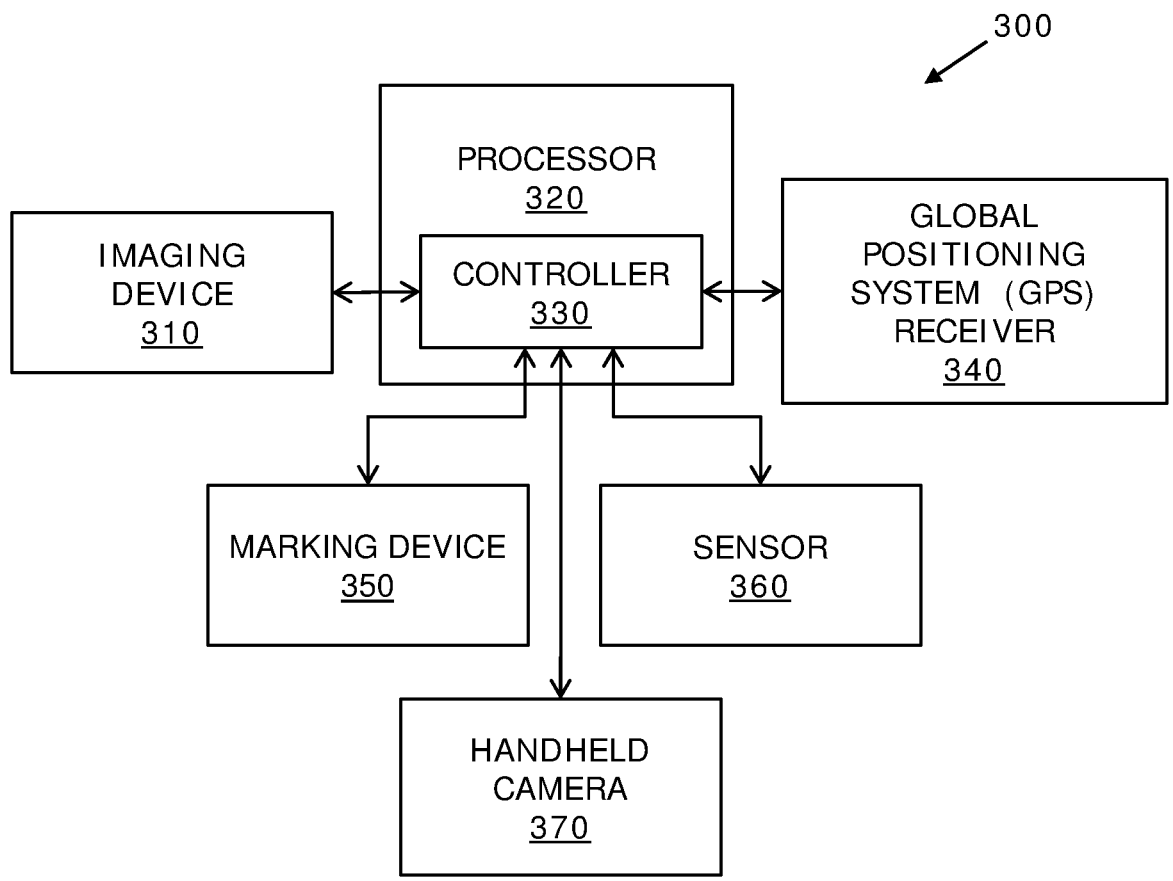
FIG. 3 is a block diagram of an exemplary arrangement for determining an origin of a log, in accordance with an embodiment of the present disclosure.

FIG. 3 is a block diagram of an exemplary arrangement 300 for determining an origin of a log, in accordance with an embodiment of the present disclosure. The arrangement 300 comprises an imaging device 310 (such as the imaging device 210 of FIG. 2), a processor 320 (such as the data processor 220 of FIG. 2) and a Global Positioning System (GPS) receiver 340 (such as the GPS receiver 230 of FIG. 2). The arrangement 300 further comprises a marking device 350 that is operable to mark the log, a sensor 360 that is operable to measure at least a weight, a length, a diameter and a quality of the log, and a handheld camera 370 that is operable to capture an image of a side of the log. Furthermore, the processor 320 comprises a controller 330 that is operable to acquire, store and process data associated with at least one image, a felling location of the log, the mark on the log, the weight of the log, the length of the log and the quality of the log for creating identification information for the log. The identification information for the log may also include type of tree.

Figure 4:
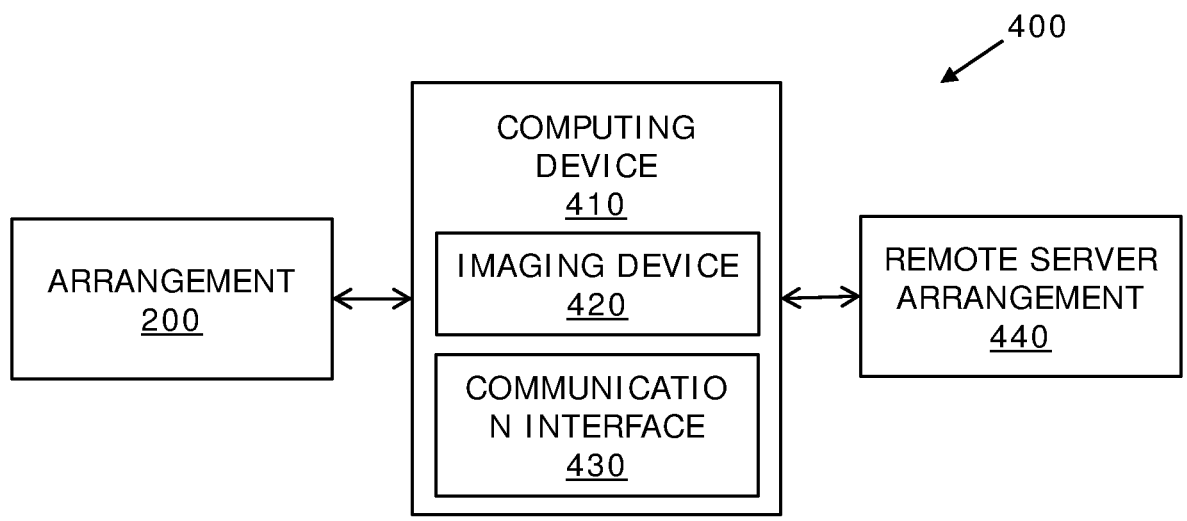
FIG. 4 is a block diagram of an exemplary system for managing identification information for a log, in accordance with an embodiment of the present disclosure.

FIG. 4 is a block diagram of an exemplary system 400 for managing identification information for a log, in accordance with an embodiment of the present disclosure. The system 400 comprises the arrangement 200 of FIG. 2, and a computing device 410 (such as the computing device 120 of FIG. 1) that is communicably coupled in operation to a remote server arrangement 440. Furthermore, the computing device 410 comprises an imaging device 420 that is operable to capture at least one subsequent image of a side of the log, and a communication interface 430 that is operable to transmit the captured at least one subsequent image to the remote server arrangement 440.

Figure 5:
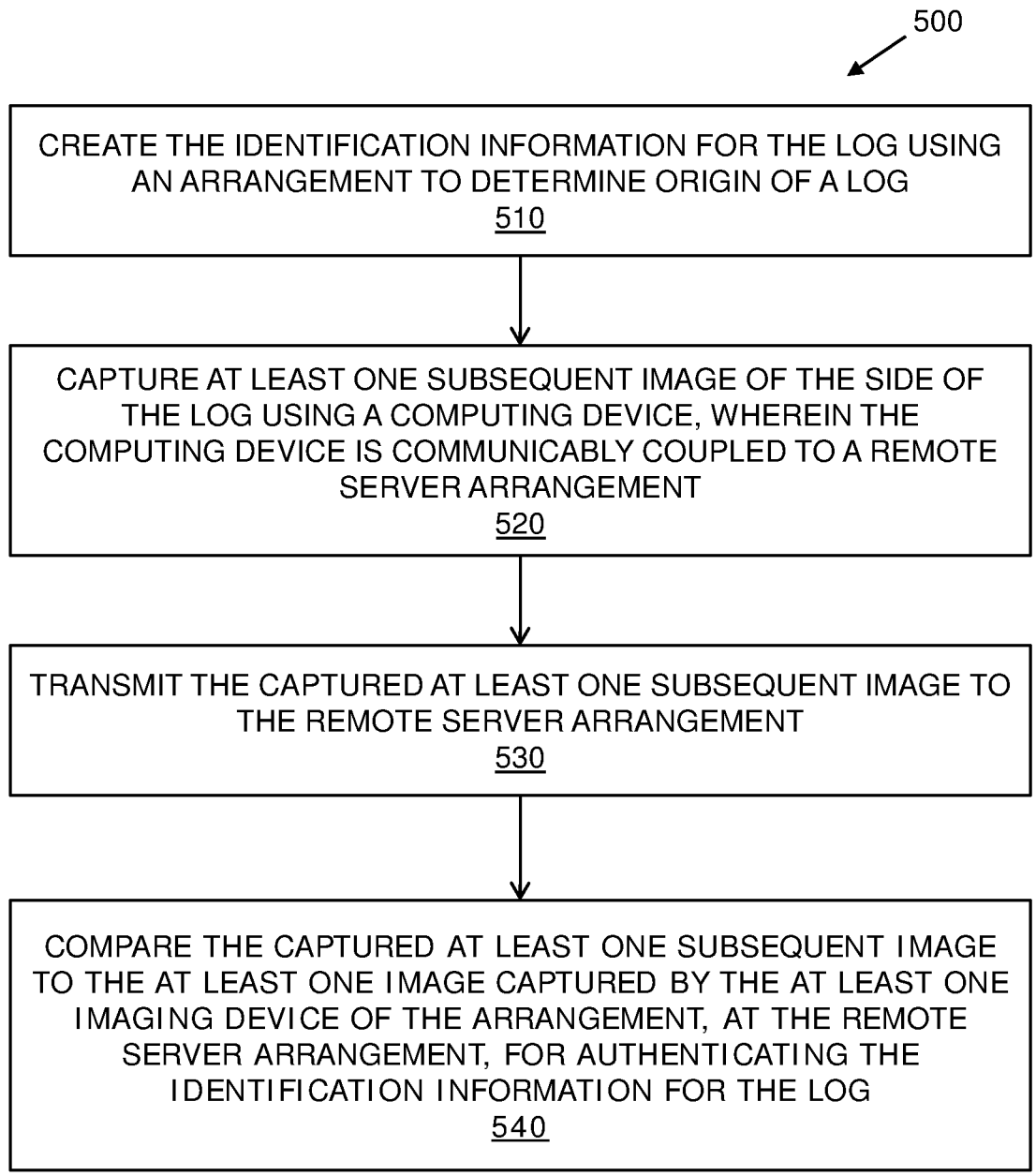
FIG. 5 is an illustration of steps of a method of managing identification information for a log, in accordance with an embodiment of the present disclosure.

FIG. 5 is an illustration of steps of a method 500 of managing identification information for a log, in accordance with an embodiment of the present disclosure. At a step 510, the identification information for the log is created using an arrangement to determine origin of a log. At a step 520, at least one subsequent image of the side of the log is captured using a computing device, wherein the computing device is communicably coupled to a remote server arrangement. At a step 530, the captured at least one subsequent image is transmitted to the remote server arrangement. At a step 540, the captured at least one subsequent image is compared to the at least one image captured by the at least one imaging device of the arrangement, at the remote server arrangement, for authenticating the identification information for the log. The step 510 includes capturing at least one image of a side of the log using at least one imaging device coupled to a forest harvester, determining a felling location of the log, using a Global Positioning System (GPS) receiver operatively coupled to the forest harvester and processing the captured at least one image and the determined felling location of the log using a data processor, to create an identification information for the log.

The steps 510 to 540 are only illustrative and other alternatives can also be provided where one or more steps are added, one or more steps are removed, or one or more steps are provided in a different sequence without departing from the scope of the claims herein. For example, the log may be one of a batch of logs, and wherein the batch of logs comprises at least two logs. In one example, the identification information for a log of the batch may be authenticated by authenticating the identification information for another log of the batch. In another example, a first number of logs may be acquired, wherein the first number is a count of logs at the felling location of the batch, and a second number of logs may be determined, wherein the second number is a count of logs within the batch at a saw mill. In yet another example, the determined second number of logs may be compared with the acquired first number of logs and identification information for the log is authenticated if the second number is less than the first number. Alternatively, if the second number is equal to or more than the first number, authentication failure of the identification information for the log is recorded.

Figure 6:
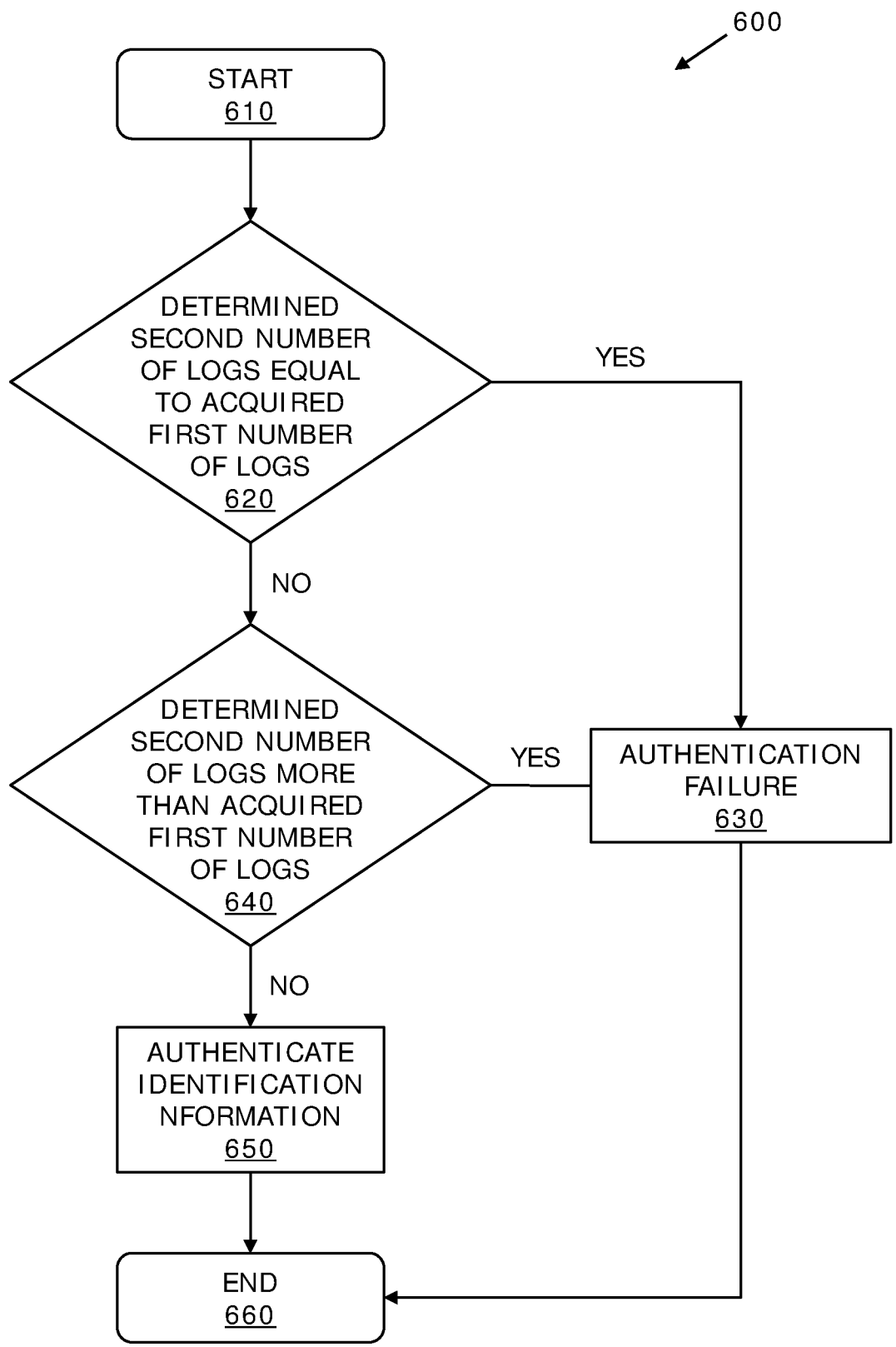
FIG. 6 is a flow-chart illustrating steps of a method of managing identification information for a log by comparing a determined second number of logs with an acquired first number of logs, in accordance with an embodiment of the present disclosure.

FIG. 6 is a flow-chart 600 illustrating steps of method for managing identification information for a log by comparing a determined second number of logs (count of logs within the batch at a saw mill) with an acquired first number of logs (count of logs at the felling location of the batch), in accordance with an embodiment of the present disclosure. At a step 620, the determined second number of logs is compared with the acquired first number of logs to check if the determined second number of logs is equal to the acquired first number of logs. At a step 630, if the determined second number of logs is equal to the acquired first number of logs, authentication failure of the identification information for the log is recorded. At a step 640, the determined second number of logs is compared with the acquired first number of logs to check if the determined second number of logs is more than the acquired first number of logs. At the step 630, if the determined second number of logs is more than the acquired first number of logs, authentication failure of the identification information for the log is recorded. At a step 650, if the determined second number of logs is less than the acquired first number of logs, the identification information for the log is authenticated.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for managing identification information for a log, wherein the system comprises:
   an arrangement for determining an origin of the log, wherein the arrangement comprises:
      at least one imaging device coupled to a forest harvester, the at least one imaging device being operable to capture at least one image of a side of the log;

a Global Positioning System (GPS) receiver that is operatively coupled to the forest harvester, wherein the GPS receiver is operable to determine a felling location of the log; and a data processor that is communicably coupled to a remote server arrangement and operable to process the captured at least one image and the determined felling location of the log to create the identification information for the log;

a computing device communicably coupled to the remote server arrangement, the computing device comprises:

at least one imaging device that is operable to capture at least one subsequent image of the side of the log;

a communication interface that is operable to transmit the captured at least one subsequent image to the remote server arrangement; and at least one sensor operable to measure features, wherein the data processor is operable to associate the measured features with the identification information for the log, wherein the features comprise at least a weight of the log, a length of the log, a diameter of the log and a quality of the log, wherein pattern recognition algorithms are employed for recognizing the features within the captured at least one subsequent image of the side of the log and the at least one image of the side of the log and for recognizing the felling location of the log, wherein the remote server arrangement is operable to authenticate the identification information for the log by comparing the features of the captured at least one subsequent image captured by the at least one imaging device of the computing device to the features of the at least one image captured by the at least one imaging device of the arrangement to recognize common features therebetween, wherein the authentication is successful when a number of the common features therebetween is higher than a predetermined minimum value, and wherein, the computing device is operable to be installed at a feed unit of a saw mill, and wherein the saw mill is operable to process the log upon authentication of the identification information for the log.

2. The system of claim 1, wherein the at least one imaging device of the arrangement is operable to capture the at least one image at an oblique angle.

3. The system of claim 1, wherein the least one imaging device of the arrangement is mounted on a harvester head of the forest harvester and positioned proximate to a chainsaw of the harvester head, to capture the at least one image of the side of the log.

4. The system of claim 1, wherein the at least one imaging device of the arrangement is mounted fixedly or retract ably on the harvester head.

5. The system of claim 1, further comprising a marking device operable to mark the log, wherein the processor is operable to associate the mark with the identification information for the log.

6. The system of claim 5, wherein the marking device comprises one of a laser and an inkjet marker.

7. The system of claim 1, wherein the at least one imaging device of the arrangement comprises a high resolution digital camera.

8. The system of claim 1, wherein the at least one imaging device of the arrangement further comprises a microwave imaging device.

9. The system of claim 1, wherein the identification information for the log further comprises type of tree.

10. The system of claim 9, wherein the processor comprises a controller of the forest harvester, wherein the controller is operable to acquire, store and process data associated with the at least one image, the felling location of the log, the mark on the log, the weight of the log, the length of the log, the diameter of the log, the quality of the log, and the type of tree for creating the identification information for the log.

11. The system of claim 10, wherein the processor is communicably coupled to the remote server arrangement and the processor is operable to transmit to the remote server arrangement, the data associated with the at least one image captured by the at least one imaging device of the arrangement, the felling location of the log, the mark on the log, the weight of the log, the length of the log, the diameter of the log, the quality of the log, and the type of tree, to the remote server arrangement for creating the identification information for the log.

12. The system of claim 1, further comprising a handheld camera operable to capture an image of the side of the log, wherein the captured image by the handheld camera is associated with the identification information for the log.

13. The system of claim 1, wherein the computing device is a portable computing device.

14. A method of managing identification information for a log, the method comprising:

determining an origin of the log by an arrangement, wherein the method of determining the origin of the log comprises:

capturing at least one image of a side of the log using at least one imaging device coupled to a forest harvester;

determining a felling location of the log, using a Global Positioning System (GPS) receiver operatively coupled to the forest harvester; and processing the captured at least one image and the determined felling location of the log using a data processor, to create an identification information for the log, wherein the data processor is communicably coupled to a remote server arrangement;

capturing at least one subsequent image of the side of the log using a computing device, wherein the computing device is communicably coupled to the remote server arrangement;

transmitting the captured at least one subsequent image to the remote server arrangement;

measuring features, by at least one sensor, for associating the measured features with the identification information for the log, wherein the features of the log comprise at least a weight of the log, a length of the log, a diameter of the log and a quality of the log, wherein pattern recognition algorithms are employed for recognizing the features within the captured at least one subsequent image of the side of the log and the at least one image of the side of the log; and for recognizing the felling location of the log, and comparing the features of the captured at least one subsequent image to the features of the at least one image captured by the at least one imaging device of the computing device to the at least one image captured by the at least one imaging device of the arrangement, at the remote server arrangement, for authenticating the identification information for the log to recognize common features therebetween, wherein the authentication is successful when a number of the common features therebetween is higher than a predetermined minimum value, and wherein, the computing device is operable to be installed at a feed unit of a saw mill, and wherein the saw mill is operable to process the log upon authentication of the identification information for the log.

15. The method of claim 14, further comprising marking the log using a marking device to provide a mark on the log, wherein the mark on the log is associated with the identification information for the log.

16. The method of claim 14, further comprising identifying a type of tree, to be associated with the with the identification information for the log.

* * * * *